United States Patent [19]

Lamberti et al.

[11] 4,021,376

[45] May 3, 1977

[54] DETERGENT COMPOSITIONS WITH NONPHOSPHATE BUILDERS CONTAINING TWO OR MORE CARBOXYL GROUPS

[75] Inventors: Vincent Lamberti, Upper Saddle River; Susan L. Kogan, New Providence, both of N.J.

[73] Assignee: Lever Brothers Company, New York, N.Y.

[22] Filed: July 13, 1973

[21] Appl. No.: 378,841

Related U.S. Application Data

[63] Continuation-in-part of Ser. No. 254,146, May 17, 1972, abandoned.

[52] U.S. Cl. .............................. 252/542; 252/89 R; 252/135; 252/173; 252/180; 252/539; 252/541; 252/555; 252/558; 252/DIG. 11; 252/DIG. 14

[51] Int. Cl.$^2$ ....................... C02B 1/22; C02B 5/06; C11D 3/20; C11D 3/22

[58] Field of Search ............ 252/89, 132, 135, 539, 252/173, 180, 541, 542, 555, 558, DIG. 11, DIG. 14

[56] References Cited

UNITED STATES PATENTS

| | | | |
|---|---|---|---|
| 2,264,103 | 11/1941 | Tucker | 210/23 |
| 2,976,248 | 3/1961 | Otrhalek | 252/156 |
| 3,235,505 | 2/1966 | Tuvell | 252/135 |
| 3,457,176 | 7/1969 | Huggins | 252/135 |
| 3,457,177 | 7/1969 | Kowalski | 252/8.8 X |
| 3,629,121 | 12/1971 | Eldib | 252/89 |
| 3,635,927 | 1/1972 | Johnston | 260/88.7 |
| 3,661,787 | 5/1972 | Brown | 252/109 |
| 3,665,000 | 5/1972 | Hills | 252/89 X |
| 3,686,124 | 8/1972 | Lyness | 252/89 |
| 3,692,685 | 9/1972 | Lamberti et al. | 252/89 |
| 3,725,290 | 4/1973 | Nelson et al. | 252/110 |
| 3,740,339 | 6/1973 | MacDonald | 252/135 |
| 3,749,675 | 7/1973 | Chang | 252/135 |
| 3,763,231 | 10/1973 | Bruson | 252/89 X |
| 3,776,851 | 12/1973 | Cheng | 252/89 |
| 3,784,486 | 1/1974 | Nelson | 252/546 |
| 3,793,228 | 2/1974 | Kandler | 252/541 |
| 3,798,183 | 3/1974 | Bruson | 252/557 |
| 3,812,044 | 5/1974 | Connor | 252/89 |
| 3,832,309 | 8/1974 | Foster | 252/527 |
| 3,844,969 | 10/1974 | Griffiths | 252/108 |
| 3,844,982 | 10/1974 | Connor | 252/544 |
| 3,849,341 | 11/1974 | Lamberti | 252/546 |
| 3,849,341 | 11/1974 | Lamberti | 252/546 |

OTHER PUBLICATIONS

F. Eichholtz et al.; "Uber Eisenkatalysen iv. Die Aktivierung des Eisens", Archiu Fuer Experimenteile Pathologie und Pharmakologie, vol. 184, pp. 605–611, 1937.

C. L. Mehltretter et al.; "Sequestration by Sugar Acids", I. & E.C., vol. 45, No. 12, Dec. 1953, pp. 2782–2784.

G. Beck; "Detection of Lanthanons with dihydroxytartrate", Chemical Abstracts, vol. 50, Col. 14440.

"Reduction of Phosphate Builder in Tallow–Based Detergent Formulations" by R. G. Bistline et al., J. Am. Oil Chemist's Soc., vol. 48, Feb. 1971, pp. 74–76.

*Primary Examiner*—Dennis L. Albrecht
*Attorney, Agent, or Firm*—Arnold Grant

[57] ABSTRACT

A detergent composition comprising a detergent surfactant selected from the group anionic, nonionic, zwitterionic and ampholytic compounds and mixtures thereof and a non-phosphate detergent builder containing two or more carboxyl groups and having a pK of the dissociation constant for the calcium complex of between about 3 to about 5, said detergent builder being selected from the group consisting of certain ether carboxylates, oxirane carboxylates, polyhydroxycarboxylates containing at least two hydroxy groups, sulfocarboxylates, polycarboxylates, acetal carboxylates and keto carboxylates, wherein the ratio of surfactant to builder in the composition is from about 0.4:1 to about 3:1 has been found to be particularly efficacious at low use concentrations, on the order of between about 0.15 percent and 0.1 percent.

8 Claims, No Drawings

DETERGENT COMPOSITIONS WITH NONPHOSPHATE BUILDERS CONTAINING TWO OR MORE CARBOXYL GROUPS

The present application is a continuation-in-part of application Ser. No. 254,146, filed May 17, 1972, now abandoned.

BACKGROUND OF THE INVENTION

The essential components for detergent formulations, used in washing of fabrics consist of a detergent compound, also called the detergent surfactant, and a detergent builder. Additionally, there may be present a number of other constituents, most notably the sodium silicates to provide buffering, anti-redeposition agents, softeners, fluorescent dyes, enzymes, bleaches, chlorine releasing agents and perfumes, etc. The balance of the formulation is generally a filler such as sodium sulfate and water. Thus, standard basic detergent formulations may be described by the following major components and percentages:

| COMPONENT | PERCENTAGES POWDERED PRODUCTS | LIQUID PRODUCTS |
|---|---|---|
| surfactant | 10 – 20 | 8 – 12 |
| builder | 30 – 50 | 15 – 30 |
| sodium silicate | 5 – 10 | 5 – 10 |
| sodium sulfate | 5 – 45 | 0 – 2 |
| water | 10 – 15 | 40 – 60 |
| hydrotrope and/or other organic detergent adjuncts | 0 – 5 | 0 – 10 |

The detergent surfactant which can be an anionic, nonionic, zwitterionic, or ampholytic compound or can be a mixture thereof, is most frequently an anionic such as sodium linear secondary alkyl ($C_{10}$–$C_{15}$) benzene sulfonate or a nonionic such as an adduct of 11 moles of ethylene oxide with 1 mole of a linear $C_{14}$–$C_{15}$ alcohol. In powdered products, nonionic detergent surfactants are generally used at the lower end of the range, e.g., around 10 to 13% while the remainder of the surfactants are used in the 15 to 20% range. In liquid products, all of the surfactant compounds are usually used at relatively lower levels, around 8 to 12%.

Typical builders for detergent formulations are the polyphosphates such as pentasodium tripolyphosphate and tetrapotassium pyrophosphate although considerable effort has been made of late, by those skilled in the art, to find replacements for these compounds because of the alleged effect phosphates have on eutrophication of certain bodies of water. While there are many factors which can be considered determinative of whether or not a compound is suitable as a detergent builder, such as the relative ability to sequester calcium and magnesium ions from solution, the crucial question always is — will it clean clothes under standard, in-home conditions. All too often compounds which appear to be efficacious in the laboratory fail to perform during in-home tests.

Careful analysis to determine causes for these poor responses has shown that no matter how explicit the use level recommendations for a detergent composition, the housewife frequently under uses the product, sometimes by as much as one-half. By way of example, most detergent compositions call for an optimum concentration of about 0.2 percent, i.e., so many cups per wash load for that type and size of washing machine to give a detergent concentration in the wash water of 0.2 percent. Practically, however, a significant percentage of housewives either do not take the trouble to measure out the required quantity and will under-estimate what is required or, will, in an attempt to save money, use one-half to three-quarters of the recommended level.

Under-use of this caliber does not represent a serious problem with detergent compositions using phosphate compounds since they are such excellent builders that the slight loss in detergency is usually not noticed. However, none of the replacements for phosphates developed to date has the building efficiency of phosphates even under the most ideal conditions. Thus, a compound which is 90 to 95 percent as efficient as phosphate when properly used drops to 85 to 80 percent and even lower efficiency if the formulation is under used. As a result a compound which was considered as a feasible alternative to phosphates becomes unacceptable.

SUMMARY OF THE INVENTION

It has now been discovered that the building efficiency of a particular class of non-phosphate builder compounds, heretofore considered as weak sequesterants, can be significantly improved, even at low wash water concentrations if the builder compounds are combined with above normal ratios of detergent surfactants. Specifically, it has been found that when builder compounds selected from the group consisting of certain ether carboxylates, oxirane carboxylates, polyhydroxycarboxylates containing at least two hydroxy groups, sulfocarboxylates, polycarboxylates, acetal carboxylates and keto carboxylates, wherein the builder compound contains two or more carboxyl groups and has a pK of the dissociation constant for the calcium complex between about 3 to about 5 are incorporated into a detergent composition at ratios of surfactant to builder of between about 0.4:1 to 3:1, the resulting detergency efficiency of the composition, especially at low wash water concentrations, approaches or equals a similar composition built with polyphosphates.

The most surprising agent of this invention is that as the level of these surfactants is increased in the composition, within the range of from 0.4:1 to about 3:1, all other factors including the level of builder remaining constant, the detergency efficiency is markedly improved. To the contrary, when these changes in surfactant/builder ratio are repeated using the same surfactants, but with polyphosphates as the builder, the detergency efficiency remains constant, or has a relatively minor increase in efficiency.

Stated again, it would be expected that the results with one builder system, i.e., polyphosphate, would correlate with the results of other builder systems, especially when, as is the case with polyphasphates, it is the standard in the art. Such however, is not the case since there are noticeable improvements in detergency when the level of surfactant is increased within the above defined range in a composition wherein the builder compound is within the presently defined class and there is, in effect, no improvement when the situation is repeated using polyphosphate as the builder.

DETAILED DESCRIPTION OF THE INVENTION

The present invention comprises a detergent composition for washing fabrics, hard surfaces such as floors and walls, dishes and glassware, plastic and metal surfaces and the like, having excellent detergency efficiency especially at low wash water concentrations, i.e., at or below about 0.15 percent, preferably between about 0.15 to about 0.10 percent, the composition comprising a specific class of detergent builder compounds combined with an anionic, nonionic, zwitterionic or ampholytic detergent or mixture thereof at ratios of surfactant to builder of from at least about 0.4:1 to about 3:1.

The particular builder compounds useful for the present invention are those having a pK of the dissociation complex for the calcium complex of between about 3 and about 5, having at least two carboxyl groups and being selected from the group consisting of certain ether carboxylates, oxirane carboxylates, sulfocarboxylates, polyhydroxycarboxylates containing at least two hydroxy groups, acetal carboxylates and keto carboxylates. As used herein pK is determined by the method of Schubert (Methods of *Biochemical Analysis*, Volume III, Interscience Publishers, Inc., New York 1956, page 247 et seq) in 0.02 molar sodium chloride solution at 50° C and pH=10. In the case of an ether, oxirane or acetal carboxylate at least one oxygen atom of the ether, oxirane or acetal is in the alpha position relative to one of the carboxylate groups. In the cases of polyhydroxycarboxylate or keto carboxylate, the hydroxy or keto group may lie in any position, but preferable is in the alpha or beta position relative to at least one of the carboxylate groups. Similarly, with sulfocarboxylates the sulfonate group may be in any position but the alpha, beta, gamma or delta positions are preferred.

The following is an exemplary list of detergent builders which are within the above defined classes and which show a significant enhancement in detergency efficiency when incorporated in detergent composition with surfactant to builder ratios of from at least about 0.4:1 to about 3:1, the alkali metal, such as sodium and potassium, ammonium and substituted ammonium such a morpholinium, alkyl ammonium, mono-, di- and trialkanol ammonium and tetra-alkyl ammonium salts of:

A. Ether Carboxylates
1. ($\alpha$-methyl) oxydiacetic acid,
2. ($\alpha,\alpha'$dimethyl) oxydiacetic acid, also known as dilactic acid,
3. ($\alpha$-methoxy-$\alpha$-hydroxymethyl) oxydiacetic acid,
4. ($\alpha$-methoxy) oxydiacetic acid,
5. the exo adduct of furan and maleic acid,
6. carboxymethyloxysuccinic acid,
7. lactoxysuccinic acid,
8. ethane - 1,2 - di(oxyacetic acid),
9. propane - 1,2,3-tri (oxyacetic acid),
10. carboxymethyloxymaleic (and fumaric) acid.

B. Oxirane Carboxylates
1. cis and trans epoxysuccinic acid

C. Polyhydroxycarboxylates containing at least two hydroxy groups
1. dihydroxyfumaric acid, also known as dihydroxymaleic acid,
2. dihydroxytartaric acid, D. Sulfocarboxylates
1. $\alpha$ - methoxy- $\beta$-sulfosuccinic acid,
2. $\alpha$ - hydroxyethoxy- $\beta$-sulfosuccinic acid,
3. disulfosuccinic acid,
4. $\alpha$ - hydroxy- $\beta$-sulfosuccinic acid.

E. Polycarboxylates
1. aconitic acid, cis and trans,
2. propane-1,1,2,3 tetracarboxylic acid,
3. polyacrylic acids having a molecular weight less than about 5000.

F. Acetal Carboxylates
1. dicarboxyl starch prepared by the hypochlorite oxidation of corn starch at pH 8-9 using three moles of hypochlorite per mole of anhydroglucose unit,
2. dicarboxyl starch derived from enzyme hydrolyzed corn starch containing less than about 100 anhydroglucose units per molecule.

G. Keto Carboxylates
1. Keto disuccinic acid.

Preferred compounds calling within these groups are the above salts of ($\alpha$-methyl) oxydiacetic acid, dilactic acid, epoxysuccinic acid, carboxymethyloxysuccinic acid and lactoxysuccinic acid. Particularly preferred compounds are those containing at least three carboxylate groups.

The particular surfactants which demonstrate the unexpected improvement in detergency efficiency when combined at above normal levels with one or more of the members of the above defined groups of detergent builders are anionic, nonionix, zwitterionic and ampholytic detergent compounds and mixtures thereof. By above normal levels of surfactant is meant ratios of surfactant to builder in the composition of from about 0.4:1 to about 3:1, preferably from about 0.7:1 to about 2.5:1.

Preferred detergent surfactants are alkali metals (sodium, potassium and lithium) salts of linear secondary alkyl ($C_{10}$–$C_{15}$) benzene sulfonate, the alkali metal salts of $C_{15}$–$C_{18}$ AOS, an anionic surfactant which is the product prepared by the $SO_3$/air sulfonation of $C_{15}$-$C_{18}\alpha$-olefins followed by reaction with an alkali metal hydroxide to form the alkali metal salt, Tergitol 15-S-7, a product of Union Carbide which is an adduct of 7 moles of ethylene oxide with 1 mole of a $C_{11}$–$C_{15}$ random linear secondary alcohol derived from $C_{11}$–$C_{15}$ normal paraffins, $C_{14}$–$C_{16}$ HAMT, an ampholytic surfactant which is an alkali metal, preferably sodium, hydroxyalkyl ($C_{14}$–$C_{16}$) N-methyltaurate, and cocodimethylsulfopropylbetaine.

In the case of powdered detergents these ratios correspond to surfactant levels in the range of from about 20 to about 60 weight percent; however, the preferred range, from the standpoint of economics and the relative improvement for each incremental increase in the level of surfactant is from about 25 to about 50 weight percent, with the most preferred range for the surfactant being from about 25 to about 40 weight percent all being based on the weight of the composition.

In the case of liquid detergents, these ratios correlate to between about 15 to 30 weight percent for the surfactant, with the preferred range being between about 17 to about 25 weight percent.

As stated above it was found that an unpredictable and synergistic relationship exists between the particular builder compounds falling within the above defined class and surfactants when the surfactants are incorporated into the detergent compositions at the increased levels of the above defined ratios. The surprising and unpredictable aspect of the discovery is that when it is repeated using polyphosphate as the builder compound, increases in the levels of these surfactants in the composition have no or relatively minor effect on detergency efficiency.

Other materials which may be present in the detergent compositions of the invention are those conventionally found therein. Typical examples include soil suspending agents, hydrotropes, corrosion inhibitors, dyes, perfumes, fillers, abrasives, optical brighteners, enzymes, suds boosters, suds depressants, detergent boosters, germicides, antitarnishing agents, cationic detergents, softeners, bleaches, bleach activators, chlorine releasing agents, buffers and the like. The balance of the detergent compositions is water.

EXAMPLES 1–72

The detergent formulations set forth below were prepared by blending together the recited components and then tested for detergency or cleansing ability in the Terg-O-Tometer Test with the following washing conditions: VCD (vacuum cleaner dust) soil cloth: 120° F; 180 ppm water (2/1 Ca++/Mg++) 0.1% concentration for examples 1–54 and 0.15% for examples 55–72 of total formulation in washing solution; pH 10.

The following abbreviations have been used herein: LAS, an anionic surfactant, is a sodium linear secondary alkyl ($C_{10}$–$C_{15}$) benzene sulfonate; $C_{15}$ – $C_{18}$ AOS, an anionic surfactant, is the product prepared by the $SO_3$/air sulfonation of $C_{15}$–$C_{18}$ α-olefins followed by reaction with sodium hydroxide to form the sodium salts; Neodol 45-11, a nonionic surfactant, is an adduct of 11 moles of ethylene oxide with 1 mole of Neodol 45, a linear $C_{14}$–$C_{15}$ alcohol (produced by Shell Chemical Co.); ($C_{14}$–$C_{16}$) N-methyltaurate; sulfobetaine DCH is a zwitterionic surfactant which is cocodimethylsulfopropylbetaine, RU silicate solids is a sodium silicate having an $SiO_2$:$Na_2O$ ratio of 2.4:1; STPP is pentasodium tripolyphosphate; and, ODA is oxydiacetate. The detergency of the formulation is expressed in "Detergency Units" (DU's) which is obtained by subtracting the initial reflectance of the soil cloth from the final reflectance of the washed cloth (the average of two runs). The reflectances are measured with a Gardner Automatic Color Difference Meter.

| FORMULATIONS (%) | | | | | | | | |
|---|---|---|---|---|---|---|---|---|
| COMPONENT | 1 | 2 | 3 | 4 | 5 | 6 | 7 | 8 |
| α-methyl-ODA | 50 | 50 | — | — | — | — | — | — |
| α-methoxy-ODA | — | — | 50 | 50 | — | — | — | — |
| α-methoxy-α'-hydroxy methyl-ODA | — | — | — | — | 50 | 50 | — | — |
| α-carboxy-ODA | — | — | — | — | — | — | 50 | 50 |
| LAS | 18 | 27 | 18 | 27 | 18 | 27 | 18 | 27 |
| RU Silicate Solids | | | | | | 10 | | |
| Water | | | | | | balance | | |
| Detergency (DU's) | 14.4 | 17.9 | 13.2 | 17.7 | 11.2 | 15.4 | 20.0 | 22.7 |

| COMPONENT | 9 | 10 | 11 | 12 | 13 | 14 | 15 | 16 |
|---|---|---|---|---|---|---|---|---|
| α-methyl-α-carboxy-ODA | 50 | 50 | — | — | — | — | — | — |
| α-methyl-α'-carboxy-ODA | — | — | 50 | 50 | — | — | — | — |
| STPP | — | — | — | — | 50 | 50 | — | — |
| LAS | 18 | 27 | 18 | 27 | 18 | 27 | 18 | 27 |
| RU Silicate Solids | 10 | 10 | 10 | 10 | 10 | 10 | 10 | 10 |
| Water | | | | | | balance | | |
| Detergency (DU's) | 20.7 | 22.0 | 19.5 | 22.6 | 19.5 | 20.3 | 8.1 | 8.4 |

| COMPONENT | 17 | 18 | 19 | 20 |
|---|---|---|---|---|
| Disodium cis-Epoxysuccinate | 50 | 50 | — | — |
| STPP | — | — | 50 | 50 |
| LAS | 18 | 27 | 18 | 27 |
| RU Silicate Solids | 10 | 10 | 10 | 10 |
| Water | | balance | | |
| Detergency (DU's) | 24.3 | 26.0 | 30.1 | 30.5 |

| COMPONENT | 21 | 22 | 23 | 24 |
|---|---|---|---|---|
| Disodium cis-Epoxysuccinate | 50 | 50 | — | — |
| STPP | — | — | 50 | 50 |
| Sulfobetaine DCH | 18 | 27 | 18 | 27 |
| RU Silicate Solids | 10 | 10 | 10 | 10 |
| Water | | balance | | |
| Detergency (DU's) | 24.4 | 27.2 | 28.2 | 28.8 |

| COMPONENT | 25 | 26 | 27 | 28 | 29 | 30 |
|---|---|---|---|---|---|---|
| Trisodium Carboxy-Methyloxysuccinate | 50 | 50 | 50 | — | — | — |
| Disodium salt of furan maleic acid adduct | — | — | — | 50 | 50 | 50 |
| LAS | 18 | 27 | 36 | 18 | 27 | 36 |
| RU Silicate Solids | 10 | 10 | 10 | 10 | 10 | 10 |
| Water | | | balance | | | |
| Detergency (DU's) | 22.6 | 24.4 | 24.7 | 10.8 | 12.0 | 15.1 |

| COMPONENT | 31 | 32 | 33 | 34 | 35 | 36 |
|---|---|---|---|---|---|---|
| Dicarboxyl starch via hypochlorite oxidation | 50 | 50 | — | — | — | — |
| Trisodium methoxy sulfosuccinate | — | — | — | — | 50 | 50 |
| STPP | — | — | 50 | 50 | — | — |
| LAS | 18 | 27 | 18 | 27 | 18 | 27 |
| RU Silicate Solids | 10 | 10 | 10 | 10 | 10 | 10 |
| Water | | | | balance | | |
| Detergency (DU's) | 22.2 | 25.9 | 27.9 | 28.1 | 15.0 | 19.2 |

| COMPONENT | 37 | 38 | 39 | 40 | 41 |
|---|---|---|---|---|---|

-continued

| FORMULATIONS (%) | | | | | |
|---|---|---|---|---|---|
| Trisodium α-hydroxy-β-sulfosuccinate | 50 | 50 | — | — | — |
| Trisodium α-hydroxy-ethoxy-β-sulfosuccinate | — | — | 50 | 50 | 50 |
| LAS | 18 | 36 | 18 | 27 | 36 |
| RU Silicate Solids | 10 | 10 | 10 | 10 | 10 |
| Water | | | balance | | |
| Detergency (DU's) | 17.9 | 24.7 | 14.9 | 16.5 | 23.6 |

| COMPONENT | 42 | 43 | 44 |
|---|---|---|---|
| Disodium Dihydroxy Maleate | 50 | 50 | 50 |
| LAS | 18 | 27 | 36 |
| RU Silicate Solids | 10 | 10 | 10 |
| Water | | balance | |
| Detergency (DU's) | 13.4 | 19.8 | 19.4 |

| COMPONENT | 45 | 46 | 47 | 48 |
|---|---|---|---|---|
| LAS | 18 | 27 | 36 | 40 |
| STPP | | 50 | | |
| RU Silicate Solids | | 10 | | |
| Water | | balance | | |
| Detergency (DU's) | 20.0 | 19.6 | 20.4 | 20.7 |

| COMPONENT | 49 | 50 | 51 | 52 | 53 | 54 | 55 | 56 |
|---|---|---|---|---|---|---|---|---|
| Disodium cis-Epoxy succinate | 50 | 50 | 50 | 50 | — | — | — | — |
| STPP | — | — | — | — | 50 | 50 | 50 | 50 |
| $C_{15-18}$ AOS | 18 | 27 | 36 | 40 | 18 | 27 | 36 | 40 |
| RU Silicate Solids | | | | 10 | | | | |
| Water | | | | balance | | | | |
| Detergency (DU's) | 21.1 | 23.5 | 23.9 | 24.3 | 21.7 | 23.9 | 24.6 | 24.4 |

| COMPONENT | 57 | 58 | 59 | 60 | 61 | 62 | 63 | 64 |
|---|---|---|---|---|---|---|---|---|
| Disodium cis-Epoxysuccinate | 50 | 50 | 50 | 50 | — | — | — | — |
| STPP | — | — | — | — | 50 | 50 | 50 | 50 |
| Tergitol 15-S-7 | 10 | 15 | 20 | 25 | 10 | 15 | 20 | 25 |
| RU Silicate Solids | | | | 10 | | | | |
| Water | | | | balance | | | | |
| Detergency (DU's) | 23.5 | 25.0 | 25.1 | 25.2 | 25.0 | 26.2 | 26.2 | 26.0 |

| COMPONENT | 65 | 66 | 67 | 68 | 69 | 70 | 71 | 72 |
|---|---|---|---|---|---|---|---|---|
| Disodium cis-Epoxysuccinate | 50 | 50 | 50 | 50 | — | — | — | — |
| STPP | — | — | — | — | 50 | 50 | 50 | 50 |
| $C_{14-16}$ HAMT | 18 | 27 | 36 | 40 | 18 | 27 | 36 | 40 |
| RU Silicate Solids | | | | 10 | | | | |
| Water | | | | balance | | | | |
| Detergency (DU's) | 22.5 | 22.6 | 22.8 | 23.0 | 23.5 | 24.0 | 23.6 | 24.3 |

The significance of these examples and the synergistic relationship which they demonstrate when the detergent builder is within the defined ratio range can be seen by a direct comparison using STPP as the control. Looking to examples 13 and 14 it can be seen that there is almost no effect on detergency as a result of increasing the level of surfactant, in this case the anionic LAS, from 18 to 27 weight percent when STPP is the builder. With derivatives of oxydiacetate, a builder compound within the defined class of the present invention, quite to the contrary, increasing the level of surfactant from 18 to 27 weight percent as shown in examples 1-12 correspondingly increases the detergency efficiency from 14.4 to 17.9 DU's, from 13.2 to 17.7, from 11.2 to 15.4, from 20.0 to 22.7, from 20.7 to 22.0 and from 19.5 to 22.6. Similarily, in examples 17-20 there is an increase of only 0.4 DU's (insignificant) when STPP is the builder, but an increase of 1.7 DU's when disodium cis-epoxysuccinate is the detergent builder.

In examples 21-24 with sulfobetaine DCH as the detergent surfactant, detergency efficiency is increased only 0.6 DU's, for all intents and purposes — no improvement when STPP is the builder and the level of surfactant is raised from 18 to 27 weight percent; while when disodium cis-epoxysuccinate is the builder, detergency efficiency increases almost 3 DU's. Examples 25-27 wherein the builder is trisodium carboxymethyloxysuccinate, shows an increase of 2.1 DU's while examples 28-30, wherein the builder is disodium salt of furan/maleic acid adduct shows an increase of better than 4 DU's when the LAS is increased from 18 percent to 36 percent.

Examples 31-36 demonstrate an increase in DU's of 3.7 and 4.2, respectively when LAS is increased from 18 to 27 weight percent and dicarboxyl starch and trisodium methoxy succinate are the detergent builders; whereas there is essentially no increase, when the same conditions are repeated using STPP as the builder compound.

Very significant improvements are also demonstrated in examples 37-44, going from 17.9 to 24.7 DU's with trisodium α-hydroxy-β-sulfosuccinate as the builder; from 14.9 to 23.6 DU's with trisodium α-hydroxy-ethoxy-β-sulfosuccinate; and, 13.4 to 19.4 DU's with disodium dihydroxy maleate.

Similar results are shown in examples 49-56 where increasing the level of $C_{15}$-$C_{18}$ AOS increases detergency efficiency 3.2 DU's when disocium cis-epoxysuccinate is the detergent builder, but only 2.7 DU's when STPP is present. The same relationships, i.e., significant improvements when the detergent builder is disodium cis-epoxysuccinate and the detergent actives are $C_{14}$-$C_{16}$ HAMT and Tergitol 15-S-7 as compared to the relative improvement when STPP is the detergent builder is shown in examples 45–72.

As this invention may be embodied in several forms without departing from the spirit or essential character thereof, the present embodiments are illustrative and not restrictive. The scope of the invention is defined by the appended claims rather than by the description preceding them and all embodiments which fall within the meaning and equivalency of those claims are, therefore, intended to be embraced by these claims.

What is claimed:

1. A detergent composition comprising a detergent surfactant selected from the group consisting of anionic, nonionic, zwitterionic and ampholytic compounds and mixtures thereof and a nonphosphate detergent builder compound which is the alkali metal, ammonium, morpholinium, alkyl ammonium, mono-, di-, and trialkanol ammonium or tetra-alkyl ammonium salt of dihydroxyfumaric acid the ratio of detergent surfactant to detergent builder being from about 0.4:1 to about 3:1.

2. A detergent composition as defined in claim 1 wherein the detergent surfactant is selected from the group consisting of alkali metal salts of linear secondary alkyl ($C_{10}$–$C_{15}$) benzene sulfonate, the alkali metal salts of the product prepared by the $SO_3$/air sulfonation of $C_{15}$–$C_{18}$ $\alpha$-olefins, the adduct of 7 moles of ethylene oxide with 1 mole of a $C_{11}$–$C_{15}$ randon linear secondary alcohol derived from $C_{11}$–$C_{15}$ normal parafins, alkali metal hydroxyalkyl ($C_{14}$–$C_{16}$) N-methyltaurate, cocodimethylsulfopropylbentaine and mixtures thereof.

3. A detergent composition as defined in claim 2 wherein the composition is in powder form and the detergent surfactant is present in the composition from about 20 to about 60 weight percent.

4. A detergent composition as defined in claim 3 wherein the detergent surfactant is present in the composition from about 25 to about 50 weight percent.

5. A detergent composition as defined in claim 2 wherein the detergent surfactant is an alkali metal salt of linear secondary alkyl ($C_{10}$–$C_{15}$) benzene sulfonate.

6. A detergent composition as defined in claim 3 wherein the detergent surfactant is cocodimethylsulfopropylbetaine.

7. A detergent composition as defined in claim 2 wherein the composition is in liquid form and the detergent surfactant is present from about 15 to about 30 weight percent.

8. A detergent composition as defined in claim 7 wherein the detergent surfactant is present from about 17 to about 25 weight percent.

* * * * *

UNITED STATES PATENT AND TRADEMARK OFFICE
CERTIFICATE OF CORRECTION

PATENT NO. : 4,021,376
DATED : May 3, 1976
INVENTOR(S) : Vincent Lamberti and Susan L. Kogan It is certified that error appears in the above-identified patent and that said Letters Patent are hereby corrected as shown below:

Claim 2, column 10, line 2: "randon" should be -- random --.

Claim 2, column 10, line 5: "cocodimethylsulfopropylbentaine" should be -- cocodimethylsulfopropylbetaine --.

Signed and Sealed this thirtieth Day of August 1977

[SEAL]

Attest:

RUTH C. MASON
Attesting Officer

C. MARSHALL DANN
Commissioner of Patents and Trademarks